United States Patent
Kubota et al.

(10) Patent No.: US 9,815,724 B2
(45) Date of Patent: *Nov. 14, 2017

(54) SCALE SUPPRESSION APPARATUS, GEOTHERMAL POWER GENERATION SYSTEM USING THE SAME, AND SCALE SUPPRESSION METHOD

(71) Applicant: Fuji Electric Co., Ltd., Kawasaki-shi, Kanagawa (JP)

(72) Inventors: Kokan Kubota, Kanagawa (JP); Yoshitaka Kawahara, Kanagawa (JP); Ichiro Myogan, Kanagawa (JP); Osamu Kato, Iwate (JP)

(73) Assignee: Fuji Electric Co., Ltd, Kawasaki-Shi (JP)

( * ) Notice: Subject to any disclaimer, the term of this patent is extended or adjusted under 35 U.S.C. 154(b) by 453 days.

This patent is subject to a terminal disclaimer.

(21) Appl. No.: 14/396,372

(22) PCT Filed: Apr. 26, 2013

(86) PCT No.: PCT/JP2013/002872
§ 371 (c)(1),
(2) Date: Oct. 22, 2014

(87) PCT Pub. No.: WO2013/161324
PCT Pub. Date: Oct. 31, 2013

(65) Prior Publication Data
US 2015/0121867 A1    May 7, 2015

(30) Foreign Application Priority Data

Apr. 27, 2012 (JP) .................................. 2012-103698

(51) Int. Cl.
*C02F 1/68* (2006.01)
*C02F 5/02* (2006.01)
(Continued)

(52) U.S. Cl.
CPC ................. *C02F 5/08* (2013.01); *C02F 1/008* (2013.01); *C02F 5/02* (2013.01); *C02F 5/083* (2013.01);
(Continued)

(58) Field of Classification Search
CPC .... C02F 1/008; C02F 1/66; C02F 5/08; C02F 5/083; C02F 5/10; C02F 5/12; C02F 5/14;
(Continued)

(56) References Cited

U.S. PATENT DOCUMENTS 3,455,157 A  *  7/1969  Lahaye ................... E21B 47/06
                                                    73/152.55
4,974,446 A  *  12/1990  Vigneaux ............ E21B 17/1021
                                                    73/152.42
(Continued)

FOREIGN PATENT DOCUMENTS

| JP | S63-039700 A | 2/1988 |
| JP | H09-206733 A | 8/1997 |

(Continued)

OTHER PUBLICATIONS

Japanese Office Action dated Nov. 18, 2015 in corresponding JP Patent Application No. 2012-103698, and its English translation.
(Continued)

*Primary Examiner* — Joseph Drodge
(74) *Attorney, Agent, or Firm* — Young Basile Hanlon & MacFarlane, P.C.

(57) ABSTRACT

A scale suppression apparatus capable of suppressing in a low-priced manner the generation of silica-based scale and calcium-based scale in the influent water containing at least a silica component and a calcium component, a geothermal power generation system using the same, and a scale suppression method are provided. The scale suppression appa-
(Continued)

ratus includes a chelating agent and alkaline agent addition unit injecting liquid containing a chelating agent and an alkaline agent into a pipe arrangement through which influent water such as geothermal water or the like flows, and a controller controlling a pump and a valve of the chelating agent and alkaline agent addition unit. The controller controls the injection of the chelating agent and the alkaline agent and stops of the injection based on the signal output from a scale detection unit for detecting a precipitation state of the scale.

9 Claims, 7 Drawing Sheets

(51) Int. Cl.
    *C02F 5/08*     (2006.01)
    *F24J 3/08*     (2006.01)
    *C02F 1/00*     (2006.01)
    *F28F 19/00*     (2006.01)

(52) U.S. Cl.
    CPC ............... *F24J 3/08* (2013.01); *F24J 3/085* (2013.01); *C02F 1/683* (2013.01); *C02F 2209/001* (2013.01); *C02F 2209/003* (2013.01); *C02F 2209/005* (2013.01); *C02F 2209/03* (2013.01); *C02F 2209/055* (2013.01); *C02F 2209/40* (2013.01); *F24J 2003/087* (2013.01); *F24J 2003/089* (2013.01); *F28F 19/00* (2013.01); *Y02E 10/14* (2013.01)

(58) Field of Classification Search
    CPC .......... C02F 2209/001; C02F 2209/005; C02F 2209/02; C02F 2209/06; C02F 2209/10; C02F 2209/40; C02F 2209/44; C02F 1/683; C02F 5/02; C02F 2209/003; C02F 1/68; C02F 1/685; C02F 1/686; C02F 1/687; C09K 8/52; C09K 8/528; E21B 37/06; F03G 7/04; F01K 27/00; F01K 23/00; F01K 25/08; F01K 7/16; F01K 19/00; F24J 3/08; F24J 3/085; F24J 2003/087; F24J 3/081; F24J 3/086; F24J 2003/088; F24J 2003/089; F24J 2200/06; F28F 19/00; Y02E 10/10; Y02E 10/30; Y02E 10/14; F22B 37/56
    USPC .......... 60/641.1–641.5; 210/85–90, 96.1, 97, 210/101–105, 138, 198.1, 199, 205, 206, 210/696–701, 747.7, 747.8, 749, 750, 210/752, 139, 143; 252/175–181
See application file for complete search history.

(56) References Cited

U.S. PATENT DOCUMENTS

| | | | | |
|---|---|---|---|---|
| 5,409,614 A * | 4/1995 | Gallup | ................... | C02F 1/042 166/267 |
| 5,656,172 A * | 8/1997 | Kitz | ......................... | C02F 1/66 166/310 |
| 5,665,242 A | 9/1997 | Gallup | | |
| 6,461,514 B1 * | 10/2002 | Al-Samadi | ........... | B01D 61/022 210/638 |
| 6,761,865 B1 * | 7/2004 | Gallup | ................... | C01B 33/22 210/696 |
| 7,470,330 B2 * | 12/2008 | Keatch | .................. | C01F 11/462 134/2 |
| 8,881,811 B2 * | 11/2014 | Reyes | .................... | C09K 8/528 166/279 |
| 2003/0132167 A1 * | 7/2003 | Haase | .................... | C02F 1/008 210/696 |
| 2010/0000579 A1 * | 1/2010 | Reinbold | ................. | A23C 7/02 134/34 |
| 2010/0300684 A1 * | 12/2010 | Kotsonis | ................ | E21B 37/06 166/250.05 |
| 2011/0168395 A1 * | 7/2011 | Welton | .................... | C09K 8/03 166/305.1 |
| 2011/0239649 A1 * | 10/2011 | Myougan | ................ | F03G 7/04 60/641.2 |
| 2012/0161068 A1 * | 6/2012 | Greene | .................... | C02F 5/10 252/181 |
| 2014/0165564 A1 | 6/2014 | Inoue et al. | | |

FOREIGN PATENT DOCUMENTS

| | | |
|---|---|---|
| JP | H09-264507 A | 10/1997 |
| JP | 2005-270903 A | 10/2005 |
| JP | 2010-090782 A | 4/2010 |
| JP | 2011-196197 A | 10/2011 |
| JP | 2011-251210 A | 12/2011 |
| JP | 2013-043145 A | 3/2013 |

OTHER PUBLICATIONS

Office Action dated Feb. 23, 2016 in corresponding JP Patent Application No. 2012-103698, and its English translation.
International Preliminary Report on Patentability in PCT/JP2013/002872 dated Oct. 28, 2014 and English translation thereof.
D. Fukuda, Geothermal Technology, vol. 34, Nos. 1 & 2, Ser. No. 74, 51-57, 2009.
National stage of PCT/JP2013/002873, filed concurrently herewith.

* cited by examiner

FIG. 7
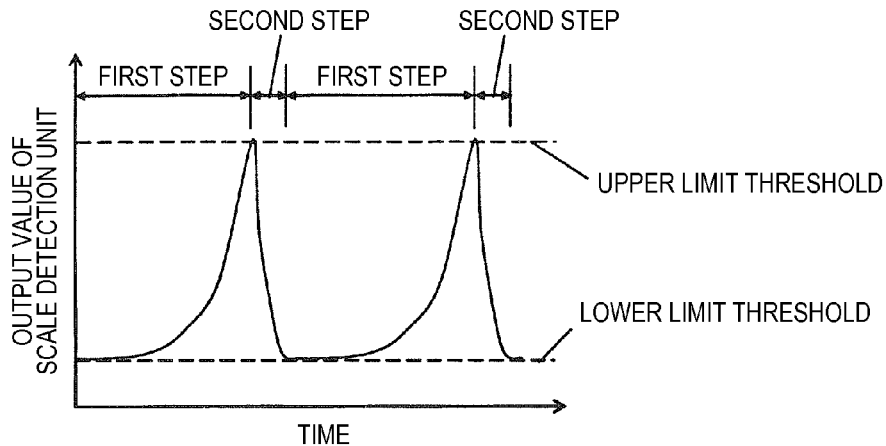
FIG. 8
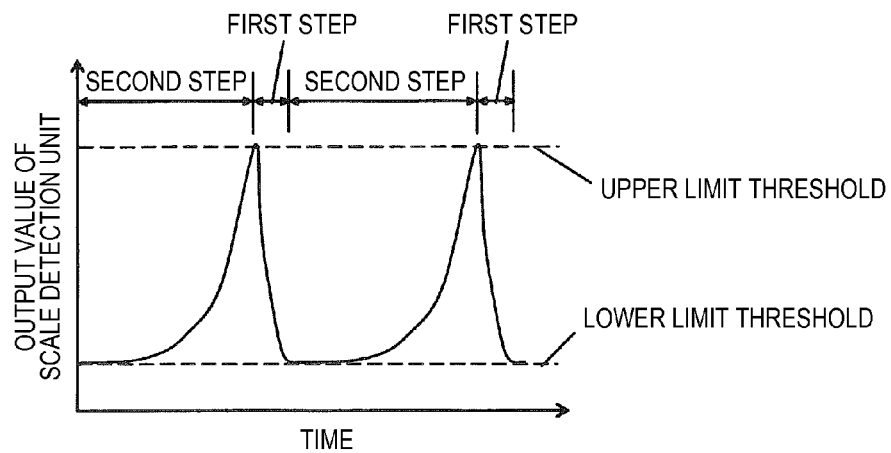
FIG. 9
|  | PRECIPITATE | DISSOLVED SUBSTANCE |
|---|---|---|
| FIRST STEP | COMPOUNDS PRECIPITATED (FOR EXAMPLE, CSH) BY REACTING WITH POLYVALENT METAL IONS ARE DISSOLVED | AMORPHOUS SILICA |
| SECOND STEP | AMORPHOUS SILICA | COMPOUNDS PRECIPITATED (FOR EXAMPLE, CSH) BY REACTING WITH POLYVALENT METAL IONS ARE DISSOLVED |

SCALE SUPPRESSION APPARATUS, GEOTHERMAL POWER GENERATION SYSTEM USING THE SAME, AND SCALE SUPPRESSION METHOD

TECHNICAL FIELD

The present disclosure relates to a scale suppression apparatus, a geothermal power generation system using the same, and a scale suppression method.

BACKGROUND

After a geothermal power generation system generates power by using steam or hot water blown out of a production well, the hot water—the temperature of which has dropped—is made to return to an injection well. Since the hot water of high temperature blown out of the production well contains more calcium and dissolved silica than those in the well water or the river water, scale such as calcium carbonate or amorphous silica is easily precipitated. In particular, in the terrestrial part and in the injection well, there is a problem of suppressing generation of silica scale due to the temperature drops of hot water in the terrestrial part.

Generally, a sulfuric acid injection method is used as a suppression method of the silica scale. In the sulfuric acid injection method, the polymerization rate of silica is suppressed by lowering the pH of hot water to reduce the scale precipitation amount. However, as the sulfuric acid injection method merely decreases the polymerization rate of silica, silica is expected to be precipitated after a sufficient time passes in the injection well. In addition, as the sulfate ion density increases, the possibility that scale such as anhydrite or the like is precipitated increases. Further, there is a problem that piping or the like is eroded with acid.

As an attempt to solve these problems, there is a method of alkalizing hot water (for example, see Daisuke Fukuda, *Geothermal Technology*, Vol. 34, Nos. 1 & 2 (Ser. No 74) 51-57, 2009) (hereinafter "Fukuda"). In other words, the solubility of amorphous silica becomes higher as the alkalinity become higher, and it suddenly rises at pH 8 or more, in particular. Therefore, silica scale is hardly generated in a high pH solution. Further, this effect continues in the injection well, since the silica precipitation amount does not increase even if the time passes, which contrasts with the above-mentioned method of suppressing the rate of silica polymerization. Furthermore, disclosed is a method of suppressing the precipitation of calcium carbonate, anhydrite, or magnesium silicate in the production well, by also using a chelating agent of catching calcium or magnesium in the production well.

BRIEF SUMMARY

In the method disclosed in Fukuda, the chelating agent is injected into the production well, whereas an alkaline agent is injected into its terrestrial part. However, a sufficient amount of chelating agent catches the calcium ion, and the generation of calcium silicate hydrates (hereinafter, simply referred to as CSH) can be prevented, whereas a large amount of the chelating agent is demanded to be injected. In general, the chelating agent is an expensive agent, and there is a problem of not being economical.

In order to address the above drawback, in a first aspect of the present disclosure there is provided a scale suppression apparatus of injecting a chelating agent and an alkaline agent into influent water containing at least a silica component and a calcium component to suppress generation of scale, the scale suppression apparatus comprising a controller configured to alternately switch between an injection operation of injecting the chelating agent and the alkaline agent and stopping of the injection operation.

With such a configuration, while the injection of the chelating agent and the alkaline agent stops, amorphous silica of super saturation is precipitated, whereas while the chelating agent and the alkaline agent are being injected, the precipitated amorphous silica can be dissolved. On the other hand, while the alkaline agent is being injected, compounds (for example, CSH) are precipitated by reacting with polyvalent metal ions unless a sufficient amount of chelating agent is injected. However, by stopping the injection of the alkaline agent, the compounds can be dissolved. By alternately repeating the injection operation of the chelating agent and the alkaline agent and the stopping of the injection operation, it is possible to minimize the use amount of the chelating agent, which is an expensive agent. Both the amorphous silica and the compounds can be dissolved alternately, and the scale can be suppressed in the long term.

In a second aspect of the present disclosure, the controller may be configured to alternately switch between the injection operation and the stopping of the injection operation at a predefined interval.

With such a configuration, switching can be operated automatically at a predefined interval by a timer function of the controller.

In a third aspect of the present disclosure, the scale suppression apparatus may further comprise a scale detection unit configured to detect a precipitation state of the scale on a downstream side from an injection point into which the chelating agent and the alkaline agent are injected, and the controller may be configured to include: a memory configured to store an output signal from the scale detection unit; and a calculation unit configured to calculate an index of the injection operation based on the output signal from the scale detection unit. The controller may also be configured to control switching between the injection operation of injecting the chelating agent and the alkaline agent and the stopping of the injection operation by comparing a calculation result of the calculation unit with an upper limit threshold and a lower limit threshold.

With such a configuration, the injection operation of the chelating agent and the alkaline agent and the stopping of the injection operation can be determined automatically according to the output value from the scale detection unit.

In a fourth aspect of the present disclosure, the scale detection unit may include: a scale precipitation unit; an upstream-side manometer configured to measure a pressure on an upstream side from the scale precipitation unit and output a signal to the controller; and a downstream-side manometer configured to measure a pressure on a downstream side from the scale precipitation unit and output a signal to the controller.

With such a configuration, the controller calculates a pressure difference between the output values from the manometers before and after the scale precipitation unit. When the pressure difference is higher than the upper limit threshold or is lower than the lower limit threshold, the injection operation of injecting the chelating agent and the alkaline agent and the stopping of the injection operation are switched. Accordingly, it is possible to automatically dissolve amorphous silica and compounds alternately in accordance with the pressure difference that varies depending on the adhesion amount of the scale at the scale precipitation unit. It is to be noted that instead of the provisions of the upstream-side manometer and the downstream-side manometer, a differential manometer for obtaining the pressure difference before and after the scale precipitation unit may be used to input a pressure difference signal output from the differential manometer into the controller.

In a fifth aspect of the present disclosure, the scale detection unit may include: a scale precipitation unit; and a flowmeter configured to measure a flow rate of an upstream side or a downstream side from the scale precipitation unit and output a signal to the controller. The controller may obtain a value by subtracting a subsequent flow rate from the flow rate below the lower limit threshold.

With such a configuration, the controller calculates a value obtained by subtracting a subsequent flow rate of the flowmeter from the flow rate of the flowmeter when the injection of the chelating agent and the alkaline agent stops. When the flow rate difference is higher than the upper limit threshold or lower than the lower limit threshold, the injection operation of injecting the chelating agent and the alkaline agent and the stopping of the injection operation are switched. Accordingly, it is possible to automatically dissolve amorphous silica and compounds alternately in accordance with the pressure difference that varies depending on the adhesion amount of the scale at the scale precipitation unit.

In a sixth aspect of the present disclosure, there is provided a geothermal power generation system comprising: an evaporator configured to evaporate a medium with geothermal water; a turbine configured to rotate with the medium; a power generator coupled to the turbine and configured to generate the power with rotational power of the turbine; a condenser configured to condense the medium come out of the turbine; a circulation pump configured to feed the medium condensed by the condenser to the evaporator; and a scale suppression unit according to any one of the above first through fifth aspects, configured to use the geothermal water that has passed through the evaporator as influent water.

With such a configuration, it is possible to suppress the generation of amorphous silica and CSH adhered to the pipe arrangement above the ground or in the injection well, and to reduce the maintenance frequency of the pipe arrangement above the ground and in the injection well.

In a seventh aspect of the present disclosure, there is provided a scale suppression method of suppressing generation of scale by injecting a chelating agent and an alkaline agent into influent water containing at least a silica component and a calcium component, the scale suppression method comprising: a first step of injecting the chelating agent and the alkaline agent; and a second step of stopping injecting the chelating agent and the alkaline agent, where the first step and the second step are alternately switched.

With such a method, in the first step of injecting the chelating agent and the alkaline agent into the influent water, it is possible to dissolve amorphous silica that has already been generated by increasing the solubility of amorphous silica. In the second step of stopping the injection of the chelating agent and the alkaline agent, it is possible to dissolve the compounds generated in the first step. The use amount of the chelating agent that is an expensive agent is minimized, both of amorphous silica and the compounds are dissolved alternatively, and the scale can be suppressed in the long term.

According to the present disclosure, in the influent water containing at least a silica component and a calcium component, it is possible to suppress in a low-priced manner the generation of silica-based scale and calcium-based scale.

BRIEF DESCRIPTION OF THE DRAWINGS

FIG. 7 is a view illustrative of variations with time in output values from a scale detection unit when a first step is performed earlier;

FIG. 8 is a view illustrative of variations with time in output values from a scale detection unit when a second step is performed earlier;

FIG. 9 is a view illustrative of relationships between precipitate and dissolved substance in a case where liquid containing a chelating agent and an alkaline agent is injected into influent water (first step) and in a case where the injection of the liquid containing the chelating agent and alkaline agent is stopped (second step);

DETAILED DESCRIPTION

Embodiments of the present disclosure will be described with reference to the drawings. It is to be noted that the present disclosure is not limited to the following embodiments, and the embodiments may be changed as necessary without departing from the scope of the present disclosure.

First Embodiment

Figure 1:
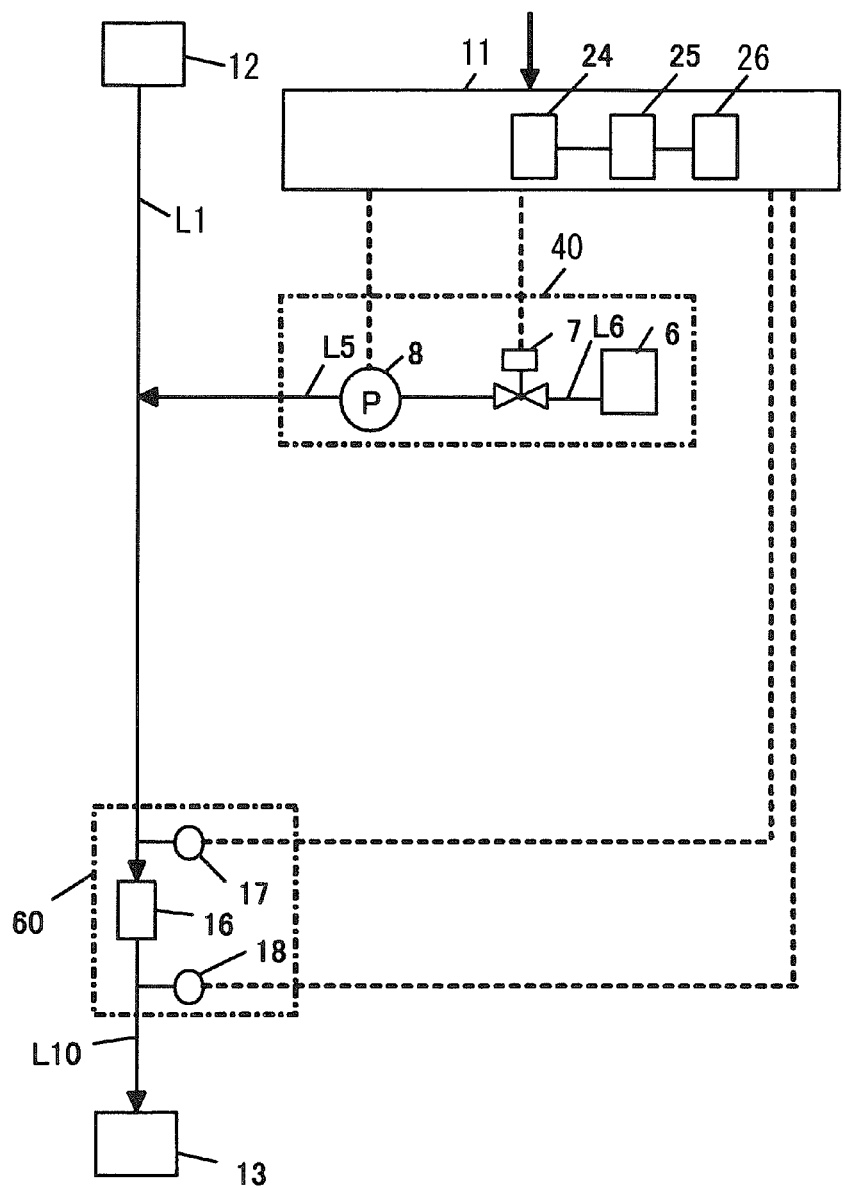
FIG. 1 is a schematic configuration view of a scale suppression apparatus according to a first embodiment of the present disclosure.

FIG. 1 is a schematic configuration view of a scale suppression apparatus according to a first embodiment of the present disclosure. The scale suppression apparatus according to the first embodiment of the present disclosure is an apparatus of suppressing the generation of silica-based scale and calcium-based scale occur in influent water containing at least a silica component and a calcium component, and includes a pipe arrangement L1, a chelating agent and alkaline agent addition unit 40, a scale detection unit 60, a pipe arrangement L10, and a controller 11.

The pipe arrangement L1 leads the influent water that has flowed from an influent water inlet 12 to the scale detection unit 60, and one end of the pipe arrangement L1 is connected to an inlet part of the scale detection unit 60.

The chelating agent and alkaline agent addition unit 40 injects liquid containing chelating agent and alkaline agent into the influent water flowing through the pipe arrangement L1, and includes a tank 6 configured to reserve the liquid containing the chelating agent and alkaline agent, a pump 8 configured to inject the liquid reserved in the tank 6 into the pipe arrangement L1, a pipe arrangement L6 configured to connect a liquid outlet port of the tank 6 and an inlet port of the pump 8, and a pipe arrangement L5 configured to connect an exhaust port of the pump 8 and an injection port of the pipe arrangement L1.

In addition, the chelating agent and alkaline agent addition unit 40 has a valve 7 for opening and closing the intake side of the pump 8, and the valve 7 is arranged in a partway of the pipe arrangement L6.

The scale detection unit 60 detects a precipitation state of the scale on a downstream side from the injection point where the chelating agent and alkaline agent are injected, and includes a scale precipitation unit 16 configured to precipitate the scale generated in the influent water. The scale precipitation unit 16 has a pipe line in which, for example, the influent water flows. The cross section of the flow path in the pipe line is changed as the scale is adhered to the inner face of the pipe line.

In addition, the scale detection unit 60 includes an upstream-side manometer 17 configured to detect an upstream-side pressure of the scale precipitation unit 16, and a signal output from the upstream-side manometer 17 is supplied to controller 11 as upstream-side pressure information of the scale precipitation unit 16. Further, the scale detection unit 60 has a downstream-side manometer 18 configured to detect a downstream-side pressure of the scale precipitation unit 16, and a signal output from the downstream-side manometer 18 is supplied to the controller 11 as downstream-side pressure information of the scale precipitation unit 16.

The pipe arrangement L10 supplies the influent water that has flown through the scale detection unit 60 to an injection well 13, and one end of the pipe arrangement L10 is connected to an outlet unit of the scale detection unit 60.

The controller 11 controls the pump 8 and the valve 7 based on the precipitation state of the scale detected by the scale detection unit 60. The controller 11 includes a memory 24 configured to store the pressure measured by the manometers 17 and 18 of the scale detection unit 60, a calculation unit 25 configured to calculate a difference in pressure between the upstream-side pressure measured by the manometer 17 and the downstream-side pressure measured by the manometer 18, and a comparison unit 26 configured to compare the pressure difference calculated by the calculation unit 25 with an upper limit threshold and a lower limit threshold.

It is to be noted that the controller 11 is connected to an input-output unit, not illustrated, so that the input-output unit can change various set values and take out data.

Figure 6:
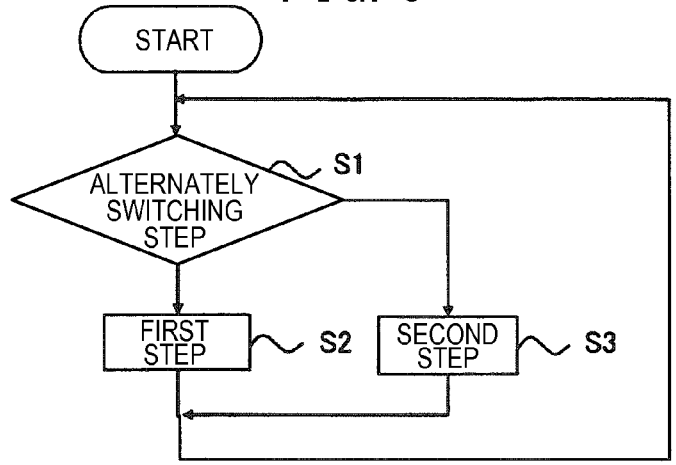
FIG. 6 is a flow chart illustrative of a scale suppression method according to the present disclosure.

In the scale suppression apparatus in the first embodiment, as illustrated in FIG. 6, a first step S2 of injecting from the chelating agent and alkaline agent addition unit 40 the liquid containing the chelating agent and alkaline agent into the pipe arrangement L1 through which the influent water flows, and a second step S3 of stopping the injection of the liquid containing the chelating agent and alkaline agent are switched alternately in a switch step S1 to suppress the generation of the scale. In this case, the first step S2 may be carried out earlier and then the second step S3 may be carried out later, or the second step S3 may be carried out earlier and then the first step S2 may be carried out later.

When the first step S2 is carried out earlier, scale (for example, CSH) is gradually precipitated at the scale precipitation unit 16 of the scale detection unit 60. The output value (i.e., pressure difference) from the scale detection unit 60 increases gradually as the first step S2 proceeds, as illustrated in FIG. 7. Then, when the output value (i.e., pressure difference) from the scale detection unit 60 exceeds the upper limit threshold, the first step S2 is switched to the second step S3, and the operation of the chelating agent and alkaline agent addition unit 40 stops.

When the first step S2 is switched to the second step S3, the scale (for example, CSH) precipitated at the scale precipitation unit 16 is dissolved, and the output value (i.e., pressure difference) from the scale detection unit 60 decreases, accordingly. Then, when the output value (i.e., pressure difference) from the scale detection unit 60 becomes lower than the lower limit threshold, the second step S3 is switched to the first step S2, and the liquid containing the chelating agent and alkaline agent is added from the chelating agent and alkaline agent addition unit 40 to the pipe arrangement L1. Subsequently, as discussed above, the first step S2 and the second step S3 are repeated alternately.

On the other hand, when the second step S3 is carried out earlier, amorphous silica is precipitated at the scale precipitation unit 16 of the scale detection unit 60. In this situation, the output value (i.e., pressure difference) from the scale detection unit 60 gradually increases as the second step S3 proceeds, as illustrated in FIG. 8. Then, when the output value (i.e., pressure difference) of the scale detection unit 60 exceeds the upper limit threshold, the second step S3 is switched to the first step S2, and the liquid containing the chelating agent and alkaline agent is added from the chelating agent and alkaline agent addition unit 40 to the pipe arrangement L1.

When the second step S3 is switched to the first step S2, amorphous silica precipitated by the scale precipitation unit 16 is dissolved, the output value (i.e., pressure difference) from the scale detection unit 60 decreases, accordingly. Then, when the output value (i.e., pressure difference) from the scale detection unit 60 becomes lower than the lower limit threshold, the first step S2 is switched to the second step S3, and the operation of the chelating agent and alkaline agent addition unit 40 stops. Subsequently, as discussed above, the second step S3 and the first step S2 are repeated alternately.

In the first step S2, the pump 8 is activated together with opening of the valve 7. Then, the liquid (i.e., liquid containing the chelating agent and alkaline agent) reserved in the tank 6 flows through the pipe arrangements L6 and L5, and is injected into the pipe arrangement L1.

In the second step S3, the pump 8 is stopped together with closing the valve 7. This stops the injection operation of the liquid (i.e., liquid containing the chelating agent and alkaline agent) which has been injected into the pipe arrangement L1 from the chelating agent and alkaline agent addition unit 40.

By carrying out the above-described first step S2 and second step S3 alternately in many variations as described above, the generation of the scale can be suppressed.

FIG. 9 illustrates relationships between precipitate and dissolved substance in a case where the liquid containing the chelating agent and alkaline agent is injected into the influent water (i.e., first step S2) and in a case where the injection of the liquid containing the chelating agent and alkaline agent is stopped (i.e., second step S3). When the liquid containing the chelating agent and alkaline agent is injected into the pipe arrangement L1 through which the influent water flows from the chelating agent and alkaline agent addition unit 40, the liquid reacts with polyvalent metal ions contained in the influent water, and compounds (for example, CSH) are precipitated, and in addition, amorphous silica is dissolved. Then, when the injection of the liquid containing the chelating agent and alkaline agent is stopped, amorphous silica is precipitated, and in addition, compounds precipitated (for example, CSH) by reacting with polyvalent metal ions are dissolved.

In the first embodiment, when the pressure difference calculated by the calculation unit 25 of the controller 11 reaches the upper limit threshold, a valve close signal is sent from the controller 11 to the valve 7 of the chelating agent and alkaline agent addition unit 40, and a pump stop signal is also sent from the controller 11 to the pump 8 of the chelating agent and alkaline agent addition unit 40. Accordingly, the pump 8 is in a stopped state together with closing the valve 7 of the chelating agent and alkaline agent addition unit 40. The injection of the liquid containing the chelating agent and alkaline agent stops.

Further, the injection of the liquid containing the chelating agent and alkaline agent stops. When the pressure difference calculated by the calculation unit 25 of the controller 11 reaches the lower limit threshold, a valve open signal is sent from the controller 11 to the valve 7 of the chelating agent and alkaline agent addition unit 40, and a pump activation signal is also sent from the controller 11 to the pump 8 of the chelating agent and alkaline agent addition unit 40. Accordingly, the pump 8 is in an activation state together with opening of the valve 7 of the chelating agent and alkaline agent addition unit 40. The injection of the liquid containing the chelating agent and alkaline agent is restarted.

As in the first embodiment, the first step S2 of injecting the liquid containing the chelating agent and alkaline agent into the influent water and the second step S3 of stopping the injection of the liquid containing the chelating agent and alkaline agent are switched alternately, so that the added amounts of the chelating agent and the alkaline agent can be reduced and reduction of the cost can be achieved.

In addition, the scale generated in the influent water is detected by the scale detection unit 60. The injection of the chelating agent and alkaline agent is controlled based on the signal output from the scale detection unit 60, so that the added amounts of the chelating agent and the alkaline agent can be reduced more.

Second Embodiment

Figure 2:
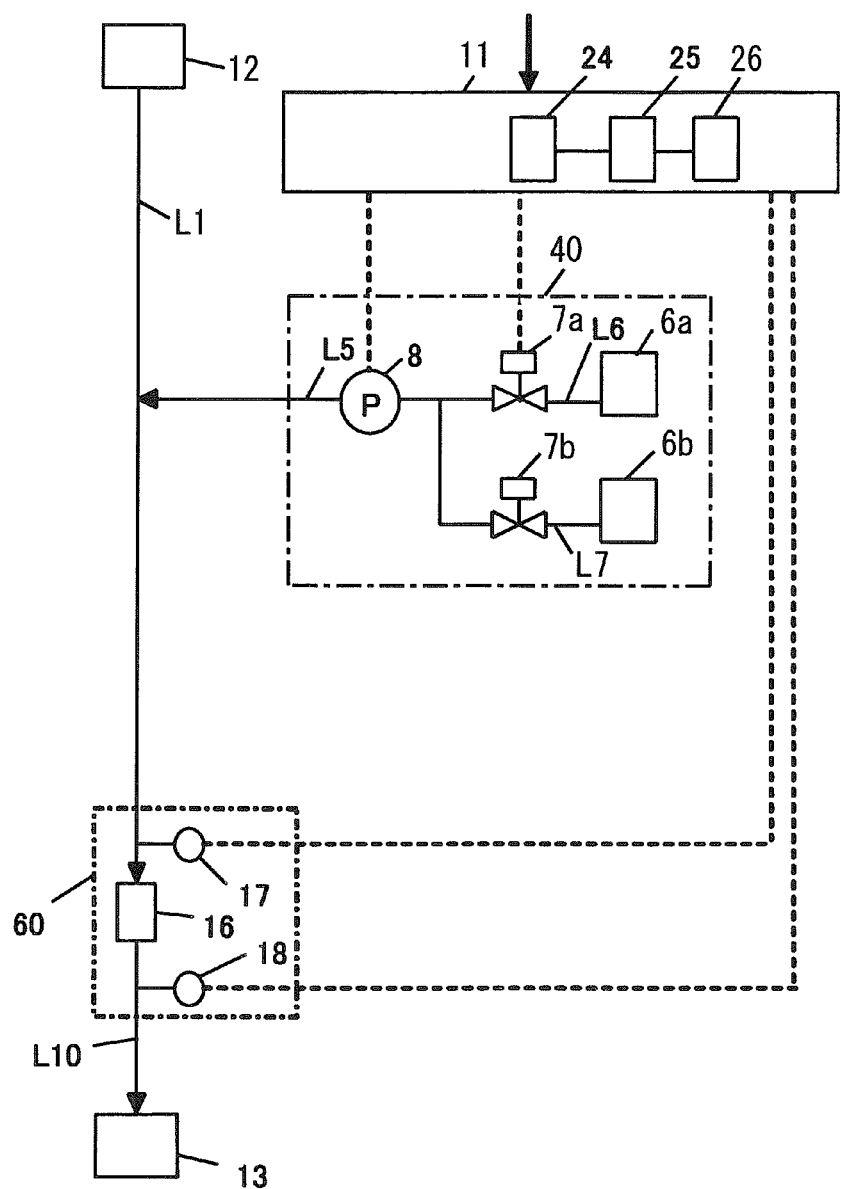
FIG. 2 is a schematic configuration view of a scale suppression apparatus according to a second embodiment of the present disclosure.

In the above-described first embodiment, the chelating agent and alkaline agent addition unit configured to inject the liquid containing the chelating agent and alkaline agent into the pipe arrangement L1 through which the influent water flows includes the tank 6 configured to reserve the liquid containing the chelating agent and alkaline agent, the pump 8 configured to inject the liquid reserved in the tank 6 into the pipe arrangement L1, the pipe arrangement L6 configured to connect the outlet port of the tank 6 and the inlet port of the pump 8, the pipe arrangement L5 configured to connect the exhaust port of the pump 8 and the injection port of the pipe arrangement L1, and the valve 7 arranged in the partway of the pipe arrangement L6 has been illustrated. However, the present disclosure is not limited to the above configuration. As illustrated in FIG. 2, for example, in a second embodiment, the chelating agent and alkaline agent addition unit 40 configured to inject the liquid containing the chelating agent and alkaline agent into the pipe arrangement L1 through which the influent water flows may include a tank 6a configured to reserve the liquid containing the chelating agent, a tank 6b configured to reserve the liquid containing the alkaline agent, the pump 8 configured to inject the liquid reserved in the tanks 6a and 6b into the pipe arrangement L1, the pipe arrangement L6 configured to connect the outlet port of the tank 6a and the inlet port of the pump 8, the pipe arrangement L7 configured to connect the outlet port of the tank 6b and the inlet port of the pump 8, the pipe arrangement L5 configured to connect the exhaust port of the pump 8 and the injection port of the pipe arrangement L1, and valves 7a and 7b arranged in pathways of the pipe arrangements L6 and L7, respectively.

Third Embodiment

Figure 3:
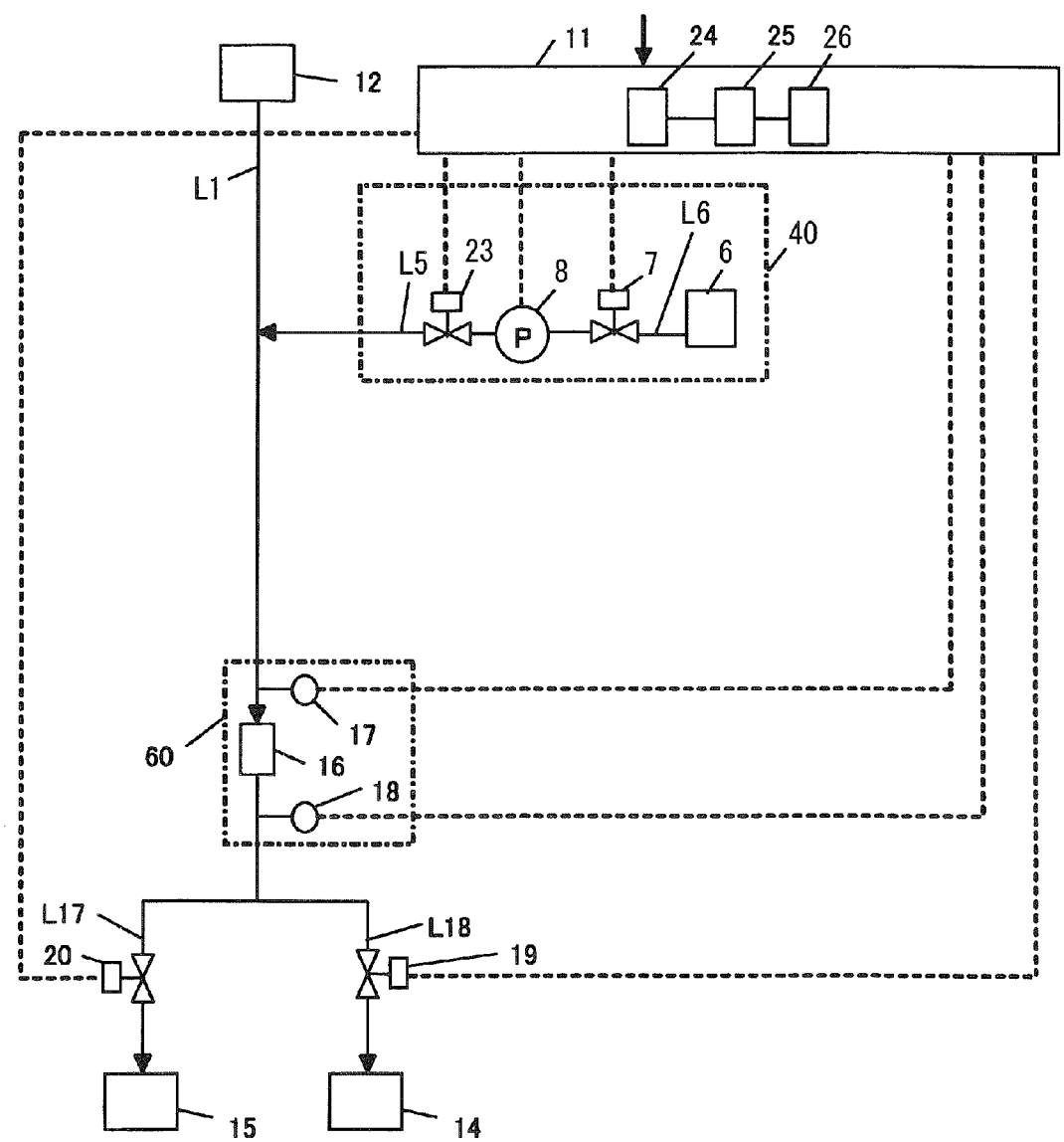
FIG. 3 is a schematic configuration view of a scale suppression apparatus according to a third embodiment of the present disclosure.

FIG. 3 is a schematic configuration view of the scale suppression apparatus according to a third embodiment of the present disclosure. The scale suppression apparatus according to the third embodiment, as illustrated in FIG. 3, includes the pipe arrangement L1, the chelating agent and alkaline agent addition unit 40, the scale detection unit 60, pipe arrangements L17 and L18, valves 19 and 20, and the controller 11.

The pipe arrangement L1 leads the influent water that has flowed from an influent water inlet 12 to the scale detection unit 60, and one end of the pipe arrangement L1 is connected to the inlet part of the scale detection unit 60.

The chelating agent and alkaline agent addition unit 40 injects the liquid containing the chelating agent and alkaline agent into the influent water flowing through the pipe arrangement L1. The chelating agent and alkaline agent addition unit 40 includes the tank 6 configured to reserve the liquid containing the chelating agent and alkaline agent, the pump 8 configured to inject the liquid reserved in the tank 6 into the pipe arrangement L1, the pipe arrangement L6 configured to connect the liquid outlet port of the tank 6 and the inlet port of the pump 8, and the pipe arrangement L5 configured to connect the exhaust port of the pump 8 and the injection port of the pipe arrangement L1.

In addition, the chelating agent and alkaline agent addition unit 40 has the valve 7 for opening and closing the intake side of the pump 8, and the valve 7 is arranged in the pathway of the pipe arrangement L6. Further, the chelating agent and alkaline agent addition unit 40 has a valve 23 for opening and closing a discharge side of the pump 8, and the valve 23 is arranged in the pathway of the pipe arrangement L5. It is to be noted that the valve 23 is not necessarily provided, but the provision of the valve 23 on the discharge side of the pump 8 enables the maintenance with ease when a failure occurs at the pump 8.

The scale detection unit 60 detects the precipitation state of the scale on a downstream side from the injection point into which the chelating agent and alkaline agent are injected, and includes the scale precipitation unit 16 configured to precipitate the scale generated in the influent water. The scale precipitation unit 16 has a pipe line through which, for example, the influent water flows, and the cross section of the flow path in the pipe line is changed as the scale is adhered to the inner face of the pipe line.

In addition, the scale detection unit 60 includes the upstream-side manometer 17 configured to detect the upstream-side pressure of the scale precipitation unit 16, and the signal output from the upstream-side manometer 17 is supplied to controller 11 as the upstream-side pressure information of the scale precipitation unit 16. Further, the scale detection unit 60 has the downstream-side manometer 18 configured to detect the downstream-side pressure of the scale precipitation unit 16, and the signal output from the downstream-side manometer 18 is supplied to the controller 11 as the downstream-side pressure information of the scale precipitation unit 16.

The pipe arrangement L17 supplies the influent water that has flowed through the scale detection unit 60 to an acidity injection well 15, and is connected to an inlet part of the acidity injection well 15.

The pipe arrangement L18 supplies the influent water that has flowed through the scale detection unit 60 to an alkalinity injection well 14, and is connected to an inlet part of the alkalinity injection well 14.

The valve 19 blocks the influent water that has flowed through the scale detection unit 60 from being injected into the alkalinity injection well 14, and is arranged in a pathway of the pipe arrangement L18.

The valve 20 blocks the influent water that has flowed through the scale detection unit 60 from being injected into the acidity injection well 15, and is arranged in a pathway of the pipe arrangement L17.

The controller 11 controls the pump 8 and the valves 7, 19, 20, and 23 based on the precipitation state of the scale detected by the scale detection unit 60. The controller 11 includes the memory 24 configured to store the pressures measured by the manometers 17 and 18 of the scale detection unit 60, the calculation unit 25 configured to calculate a pressure difference between the upstream-side pressure measured by the manometer 17 and the downstream-side pressure measured by the manometer 18, and the comparison unit 26 configured to compare the pressure difference calculated by the calculation unit 25 with an upper limit threshold and a lower limit threshold so as to determine on and off of the pump 8 or opening and closing of the valves 7, 19, 20, and 23.

In the scale suppression apparatus in the third embodiment, as illustrated in FIG. 6, the first step S2 of injecting the liquid containing the chelating agent and alkaline agent into the pipe arrangement L1 through which the influent water flows, from the chelating agent and alkaline agent addition unit 40 and the second step S3 of stopping the injection of the liquid containing the chelating agent and alkaline agent are switched alternately in a switch step S1 to suppress the generation of the scale. In this case, the first step S2 may be carried out earlier and then the second step S3 may be carried out later, or the second step S3 may be carried out earlier and then the first step S2 may be carried out later.

In the third embodiment, when the first step S2 is carried out earlier, scale (for example, CSH) is gradually precipitated at the scale precipitation unit 16 of the scale detection unit 60. The output value (i.e., pressure difference) from the scale detection unit 60 increases gradually as the first step S2 proceeds, as illustrated in FIG. 7. Then, when the output value (i.e., pressure difference) from the scale detection unit 60 exceeds the upper limit threshold, the first step S2 is switched to the second step S3, and the operation of the chelating agent and alkaline agent addition unit 40 stops.

When the first step S2 is switched to the second step S3, the scale (for example, CSH) precipitated at the scale precipitation unit 16 is dissolved, and the output value (i.e., pressure difference) from the scale detection unit 60 decreases accordingly. Then, when the output value (i.e., pressure difference) from the scale detection unit 60 becomes lower than the lower limit threshold, the second step S3 is switched to the first step S2, and the liquid containing the chelating agent and alkaline agent is added from the chelating agent and alkaline agent addition unit 40 to the pipe arrangement L1. Subsequently, as discussed above, the first step S2 and the second step S3 are repeated alternately.

On the other hand, when the second step S3 is carried out earlier, for example, amorphous silica is precipitated at the scale precipitation unit 16 of the scale detection unit 60. In this situation, the output value (i.e., pressure difference) from the scale detection unit 60 gradually increases as the second step S3 proceeds, as illustrated in FIG. 8. Then, when the output value (i.e., pressure difference) of the scale detection unit 60 exceeds the upper limit threshold, the second step S3 is switched to the first step S2, and the liquid containing the chelating agent and alkaline agent is added from the chelating agent and alkaline agent addition unit 40 to the pipe arrangement L1.

When the second step S3 is switched to the first step S2, amorphous silica precipitated at the scale precipitation unit 16 is dissolved, and the output value (i.e., pressure difference) of the scale detection unit 60 decreases, accordingly. Then, when the output value (i.e., pressure difference) from the scale detection unit 60 becomes lower than the lower limit threshold, the first step S2 is switched to the second step S3, and the operation of the chelating agent and alkaline agent addition unit 40 stops. Subsequently, as discussed above, the second step S3 and the first step S2 are repeated alternately.

In the first step S2, the pump 8 is activated together with opening of the valves 7, 19, and 23 and closing of the valve 20. Then, the liquid (i.e., liquid containing the chelating agent and alkaline agent) reserved in the tank 6 flows through the pipe arrangements L6 and L5, and is injected into the pipe arrangement L1. In addition, the influent water exhausted from the scale detection unit 60 is supplied to the alkalinity injection well 14, flowing through the pipe arrangement L18.

In the second step S3, the pump 8 is stopped together with closing of the valves 7, 19, and 23 and opening of the valve 20 so as to stop the injection of the liquid containing the chelating agent and alkaline agent.

By carrying out the above-described first step S2 and second step S3 alternately in many variations as described above, the generation of the scale can be suppressed.

When the liquid containing the chelating agent and alkaline agent is injected into the pipe arrangement L1 through which the influent water flows, from the chelating agent and alkaline agent addition unit 40, the liquid reacts with polyvalent metal ions contained in the influent water, and compounds (for example, CSH) are precipitated. In addition, amorphous silica is dissolved, as illustrated in FIG. 9. Then, when the injection of the liquid containing the chelating agent and alkaline agent is stopped, amorphous silica is precipitated. Further, compounds precipitated (for example, CSH) by reacting with polyvalent metal ions are dissolved.

In the third embodiment, when the pressure difference calculated by the calculation unit 25 of the controller 11 reaches the upper limit threshold, the valve close signals are sent from the controller 11 to the valves 7, 19, and 23, and the pump stop signal is also sent from the controller 11 to the pump 8 of the chelating agent and alkaline agent addition unit 40. Accordingly, the pump 8 is in a stopped state together with closing of the valves 7, 19, and 23. The injection of the liquid containing the chelating agent and alkaline agent stops.

Furthermore, in this situation, the valve 20 is opened by the valve open signal from the controller 11, and the influent water which has flowed through the scale detection unit 60 is supplied to the acidity injection well 15, flowing through the pipe arrangement L17.

The injection of the liquid containing the chelating agent and alkaline agent stops. When the pressure difference calculated by the calculation unit 25 of the controller 11 reaches the lower limit threshold, the valve close signal is sent to the valve 20 from the controller 11. Moreover, in this situation, the valve open signals are sent from the controller 11 to the valves 7, 19, and 23, and the pump activation signal is also sent from the controller 11 to the pump 8. Accordingly, the pump 8 is in an activation state together with opening of the valves 7, 19, and 23. The injection of the liquid containing the chelating agent and alkaline agent is restarted. Then, the influent water which has flowed through the scale detection unit 60 is supplied to the alkalinity injection well 14, flowing through the pipe arrangement L18.

As in the third embodiment, the first step of injecting the liquid containing the chelating agent and alkaline agent into the influent water and the second step of stopping the injection of the liquid containing the chelating agent and alkaline agent are switched alternately, so that the added amounts of the chelating agent and the alkaline agent can be reduced and reduction of the cost can be achieved.

In addition, the scale generated in the influent water is detected by the scale detection unit 60, and the injection of the chelating agent and alkaline agent is controlled based on the signal output from the scale detection unit 60. In this way, the added amounts of the chelating agent and the alkaline agent can be reduced more.

Fourth Embodiment

Figure 4:
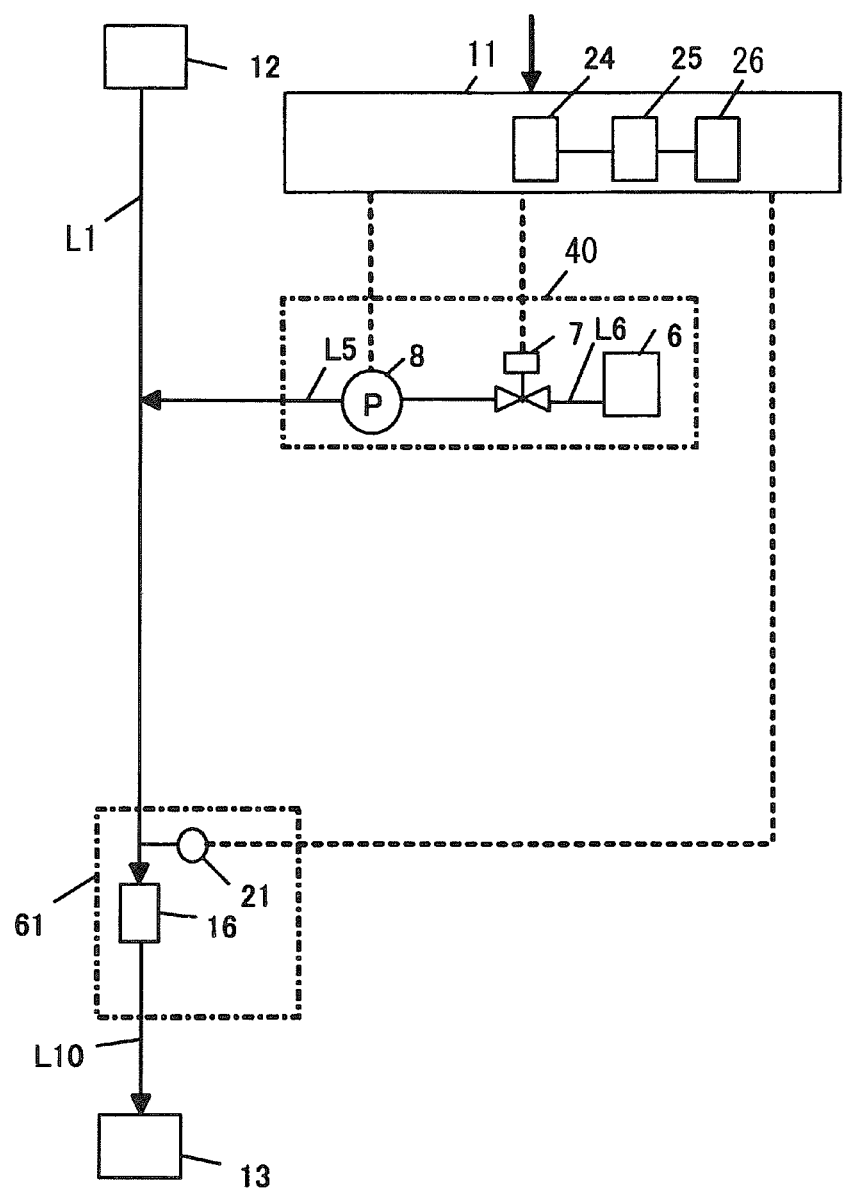
FIG. 4 is a schematic configuration view of a scale suppression apparatus according to a fourth embodiment of the present disclosure.

FIG. 4 is a schematic configuration view of a scale suppression apparatus according to a fourth embodiment of the present disclosure. The scale suppression apparatus according to the fourth embodiment of the present disclosure, as illustrated in FIG. 4, includes the pipe arrangement L1, the chelating agent and alkaline agent addition unit 40, a scale detection unit 61, the pipe arrangement L10, and the controller 11. The pipe arrangement L1 leads the influent water that has flowed from the influent water inlet 12 to the scale detection unit 61, and one end of the pipe arrangement L1 is connected to an inlet part of the scale detection unit 61.

The chelating agent and alkaline agent addition unit 40 injects the liquid containing the chelating agent and alkaline agent into the influent water flowing through the pipe arrangement L1. The chelating agent and alkaline agent addition unit 40 includes the tank 6 configured to reserve the liquid containing the chelating agent and alkaline agent, the pump 8 configured to inject the liquid reserved in the tank 6 into the pipe arrangement L1, the pipe arrangement L6 configured to connect a liquid outlet port of the tank 6 and an inlet port of the pump 8, and the pipe arrangement L5 configured to connect an exhaust port of the pump 8 and an injection port of the pipe arrangement L1.

In addition, the chelating agent and alkaline agent addition unit 40 has the valve 7 for opening and closing the intake side of the pump 8, and the valve 7 is arranged in the pathway of the pipe arrangement L6.

The scale detection unit 61 detects the precipitation state of the scale on a downstream side from the injection point where the chelating agent and the alkaline agent are injected. The scale detection unit 61 includes the scale precipitation unit 16 configured to precipitate the scale generated in the influent water. The scale precipitation unit 16 has a pipe line through which, for example, the influent water flows. The cross section of the flow path in the pipe line is changed, as the scale is adhered to the inner face of the pipe line.

Further, the scale detection unit 61 includes a flowmeter 21 configured to measure a flow rate of the influent water flowing into the scale precipitation unit 16 from the pipe arrangement L1, and a signal output from the flowmeter 21 is supplied to the controller 11.

The pipe arrangement L10 supplies the influent water that has flowed through the scale detection unit 61 to the injection well 13, and one end of the pipe arrangement L10 is connected to an outlet part of the scale detection unit 61.

The controller 11 controls the pump 8 and the valve 7 based on the precipitation state of the scale detected by the scale detection unit 61. The controller 11 includes the memory 24 configured to store the flow rate of the influent water (i.e., flow rate below a lower limit threshold) measured by the flowmeter 21 of the scale detection unit 61, the calculation unit 25 configured to calculate a flow rate difference between the flow rate measured by flowmeter 21 after the chelating agent and the alkaline agent are injected and the flow rate stored in the memory 24, and the comparison unit 26 configured to compare the flow rate difference calculated by the calculation unit 25 with an upper limit threshold and a lower limit threshold.

In the scale suppression apparatus in the fourth embodiment, as illustrated in FIG. 6, the first step S2 of injecting from the chelating agent and alkaline agent addition unit 40 the liquid containing the chelating agent and alkaline agent into the influent water flowing through the pipe arrangement L1 and the second step S3 of stopping the injection of the liquid containing the chelating agent and alkaline agent are switched alternately in a switch step S1 to suppress the generation of the scale. In this case, the first step S2 may be carried out earlier and then the second step S3 may be carried out later, or the second step S3 may be carried out earlier and then the first step S2 may be carried out later.

In the fourth embodiment, when the first step S2 is carried out earlier, scale (for example, CSH) is gradually precipitated at the scale precipitation unit 16 of the scale detection unit 61. The output value (i.e., flow rate difference) from the scale detection unit 61 increases gradually as the first step S2 proceeds, as illustrated in FIG. 7. Then, when the output value (i.e., flow rate difference) from the scale detection unit 61 exceeds the upper limit threshold, the first step S2 is switched to the second step S3, and the operation of the chelating agent and alkaline agent addition unit 40 stops.

When the first step S2 is switched to the second step S3, the scale (for example, CSH) precipitated at the scale precipitation unit 16 is dissolved, and the output value (i.e., flow rate difference) from the scale detection unit 61 decreases, accordingly. Then, when the output value (i.e., flow rate difference) from the scale detection unit 61 becomes lower than the lower limit threshold, the second step S3 is switched to the first step S2, and the liquid containing the chelating agent and alkaline agent is added from the chelating agent and alkaline agent addition unit 40 to the pipe arrangement L1. Subsequently, as discussed above, the first step S2 and the second step S3 are repeated alternately.

On the other hand, when the second step S3 is carried out earlier, for example, amorphous silica is precipitated at the scale precipitation unit 16 of the scale detection unit 61. In this situation, the output value (i.e., flow rate difference) from the scale detection unit 61 gradually increases as the second step S3 proceeds, as illustrated in FIG. 8. Then, when the output value (i.e., flow rate difference) of the scale detection unit 61 exceeds the upper limit threshold, the second step S3 is switched to the first step S2, and the liquid containing the chelating agent and alkaline agent is added from the chelating agent and alkaline agent addition unit 40 to the pipe arrangement L1.

When the second step S3 is switched to the first step S2, amorphous silica precipitated at the scale precipitation unit 16 is dissolved, and the output value (i.e., flow rate difference) from the scale detection unit 61 decreases accordingly. Then, when the output value (i.e., flow rate difference) from the scale detection unit 61 becomes lower than the lower limit threshold, the first step S2 is switched to the second step S3, and the operation of the chelating agent and alkaline agent addition unit 40 stops. Subsequently, as discussed above, the second step S3 and the first step S2 are repeated alternately.

In the first step S2, the pump 8 is activated together with opening the valve 7. Then, the liquid containing the chelating agent and alkaline agent is injected into the pipe arrangement L1 from the chelating agent and alkaline agent addition unit 40.

In the second step S3, the pump 8 is stopped together with closing the valve 7. Then, the injection operation of the liquid containing the chelating agent and alkaline agent stops.

By carrying out the above-described first step S2 and second step S3 alternately in many variations as described above, the generation of the scale can be suppressed.

When the liquid containing the chelating agent and alkaline agent is injected into the pipe arrangement L1 through which the influent water flows, from the chelating agent and alkaline agent addition unit 40, as illustrated in FIG. 9, the liquid reacts with polyvalent metal ions contained in the influent water, and compounds (for example, CSH) are precipitated. In addition, amorphous silica is dissolved. Then, when the injection of the liquid containing the chelating agent and alkaline agent is stopped, amorphous silica is precipitated. In addition, compounds precipitated (for example, CSH) by reacting with polyvalent metal ions are dissolved.

In the fourth embodiment, when the flow rate difference calculated by the calculation unit 25 of the controller 11 reaches the upper limit threshold, the valve close signal is sent from the controller 11 to the valve 7 of the chelating agent and alkaline agent addition unit 40. Further, the pump stop signal is also sent from the controller 11 to the pump 8 of the chelating agent and alkaline agent addition unit 40.

Accordingly, the pump 8 is in a stopped state together with closing the valve 7 of the chelating agent and alkaline agent addition unit 40. The injection of the liquid containing the chelating agent and alkaline agent stops.

Further, when the injection of the liquid containing the chelating agent and alkaline agent stops and the pressure difference calculated by the calculation unit 25 of the controller 11 reaches the lower limit threshold, the valve open signal is sent from the controller 11 to the valve 7 of the chelating agent and alkaline agent addition unit 40. Also, the pump activation signal is also sent from the controller 11 to the pump 8 of the chelating agent and alkaline agent addition unit 40. Accordingly, the pump 8 is in an activation state together with opening the valve 7 of the chelating agent and alkaline agent addition unit 40. The injection of the liquid containing the chelating agent and alkaline agent is restarted.

As in the fourth embodiment, the first step S2 of injecting the liquid containing the chelating agent and alkaline agent into the influent water and the second step S3 of stopping the injection of the liquid containing the chelating agent and alkaline agent are switched alternately, so that the added amounts of the chelating agent and the alkaline agent can be reduced and reduction of the cost can be achieved.

In addition, the scale generated in the influent water is detected by the scale detection unit 61, and the injection of the chelating agent and alkaline agent is controlled based on the signal output from the scale detection unit 61, so that the added amounts of the chelating agent and the alkaline agent can be reduced more.

Fifth Embodiment

Figure 5:
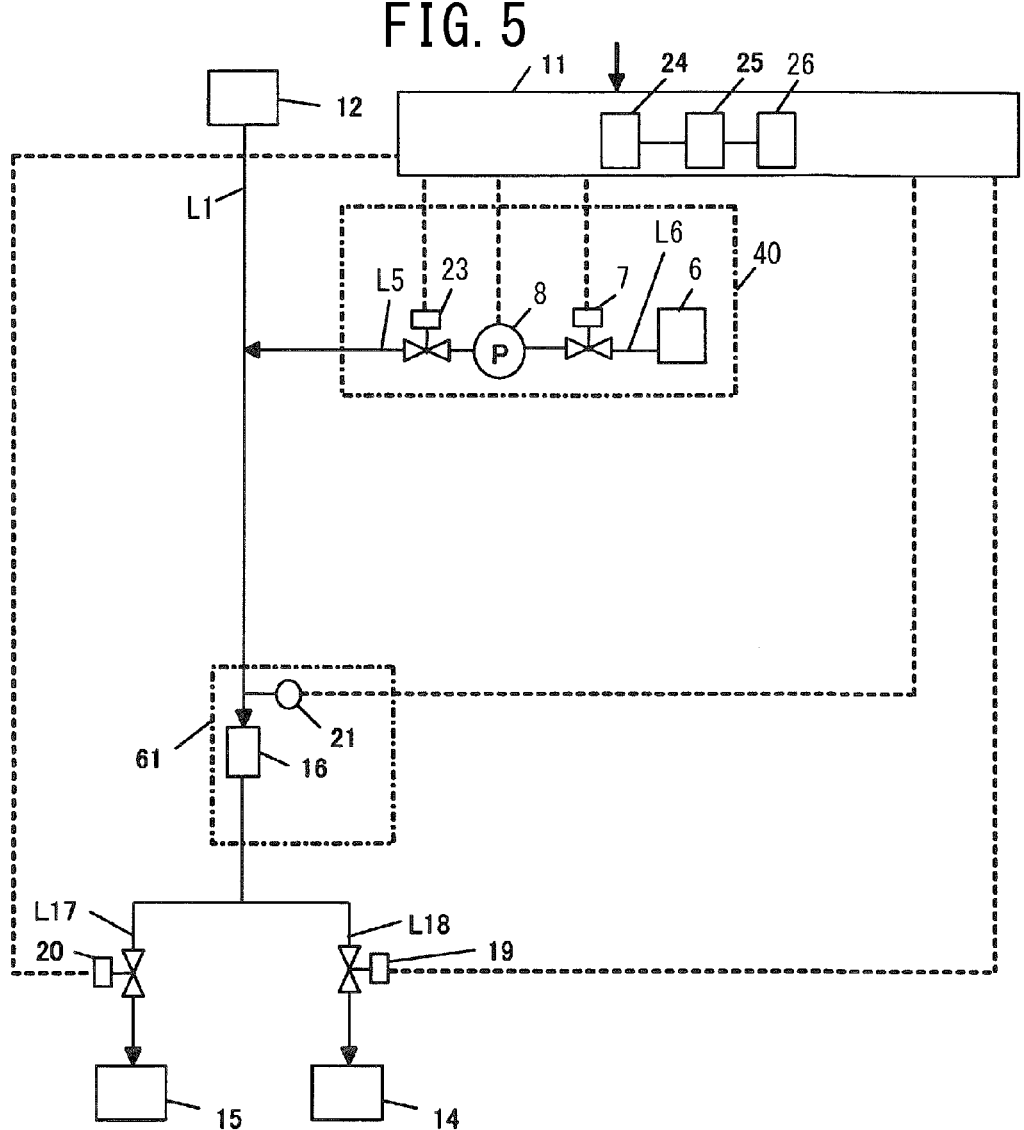
FIG. 5 is a schematic configuration view of a scale suppression apparatus according to a fifth embodiment of the present disclosure.

FIG. 5 is a schematic configuration view of a scale suppression apparatus according to a fifth embodiment of the present disclosure. The scale suppression apparatus according to the fifth embodiment of the present disclosure, as illustrated in FIG. 5, includes the pipe arrangement L1, the chelating agent and alkaline agent addition unit 40, the scale detection unit 61, pipe arrangements L17 and L18, valves 19 and 20, and the controller 11.

The pipe arrangement L1 leads the influent water that has flowed from an influent water inlet 12 to the scale detection unit 61, and one end of the pipe arrangement L1 is connected to an inlet part of the scale detection unit 61.

The chelating agent and alkaline agent addition unit 40 injects the liquid containing the chelating agent and alkaline agent into the influent water flowing through the pipe arrangement L1. The chelating agent and alkaline agent addition unit 40 includes the tank 6 configured to reserve the liquid containing the chelating agent and alkaline agent, the pump 8 configured to inject the liquid reserved in the tank 6 into the pipe arrangement L1, the pipe arrangement L6 configured to connect a liquid outlet port of the tank 6 and an inlet port of the pump 8, and the pipe arrangement L5 configured to connect an exhaust port of the pump 8 and an injection port of the pipe arrangement L1.

In addition, the chelating agent and alkaline agent addition unit 40 has the valve 7 for opening and closing the intake side of the pump 8, and the valve 7 is arranged in the partway of the pipe arrangement L6. Further, the chelating agent and alkaline agent addition unit 40 has the valve 23 for opening and closing a discharge side of the pump 8, and the valve 23 is arranged in the pathway of the pipe arrangement L5. It is to be noted that the valve 23 is not necessarily provided, but the provision of the valve 23 on the discharge side of the pump 8 enables the maintenance with ease when a failure occurs at the pump 8.

The scale detection unit 61 detects the precipitation state of the scale on a downstream side from the injection point into which the chelating agent and alkaline agent are injected, and includes the scale precipitation unit 16 configured to precipitate the scale generated in the influent water. The scale precipitation unit 16 has a pipe line through which, for example, the influent water flows. The cross section of the flow path in the pipe line is changed as the scale is adhered to the inner face of the pipe line.

Further, the scale detection unit 61 includes the flowmeter 21 configured to measure a flow rate of the influent water flowing into the scale precipitation unit 16 from the pipe arrangement L1, and the signal output from the flowmeter 21 is supplied to the controller 11.

The pipe arrangement L17 supplies the influent water that has flowed through the scale detection unit 61 to the acidity injection well 15, and is connected to the inlet part of the acidity injection well 15.

The pipe arrangement L18 supplies the influent water that has flowed through the scale detection unit 61 to the alkalinity injection well 14, and is connected to the inlet part of the alkalinity injection well 14.

The valve 19 blocks the influent water that has flowed through the scale detection unit 61 from being injected into the alkalinity injection well 14, and is arranged in the pathway of the pipe arrangement L18.

The valve 20 blocks the influent water that has flowed through the scale detection unit 61 from being injected into the acidity injection well 15, and is arranged in the pathway of the pipe arrangement L17.

The controller 11 controls the pump 8 and the valves 7, 19, 20, and 23 based on the precipitation state of the scale detected by the scale detection unit 61. The controller 11 includes the memory 24 configured to store the flow rate of the influent water (i.e., flow rate below the lower limit threshold) measured by the flowmeter 21 of the scale detection unit 61, the calculation unit 25 configured to calculate a flow rate difference between the flow rate measured by flowmeter 21 after the chelating agent and the alkaline agent are injected and the flow rate stored in the memory 24, and the comparison unit 26 configured to compare the flow rate difference calculated by the calculation unit 25 with an upper limit threshold and a lower limit threshold.

In the scale suppression apparatus in the fifth embodiment, as illustrated in FIG. 6, the first step S2 of injecting the liquid containing the chelating agent and alkaline agent into the pipe arrangement L1 through which the influent water flows, from the chelating agent and alkaline agent addition unit 40 and the second step S3 of stopping the injection of the liquid containing the chelating agent and alkaline agent are switched alternately in the switch step S1 to suppress the generation of the scale. In this case, the first step S2 may be carried out earlier and then the second step S3 may be carried out later, or the second step S3 may be carried out earlier and then the first step S2 may be carried out later.

When, in the fifth embodiment, the first step S2 is carried out earlier, scale (for example, CSH) is gradually precipitated at the scale precipitation unit 16 of the scale detection unit 61. In this situation, the output value (i.e., pressure difference) from the scale detection unit 61 increases gradually as the first step S2 proceeds, as illustrated in FIG. 7. Then, when the output value (i.e., pressure difference) from the scale detection unit 60 exceeds the upper limit threshold, the first step S2 is switched to the second step S3, and the operation of the chelating agent and alkaline agent addition unit 40 stops.

When the first step S2 is switched to the second step S3, the scale (for example, CSH) precipitated at the scale precipitation unit 16 is dissolved, and the output value (i.e., flow rate difference) from the scale detection unit 61 decreases, accordingly. Then, when the output value (i.e., flow rate difference) from the scale detection unit 61 becomes lower than the lower limit threshold, the second step S3 is switched to the first step S2, and the liquid containing the chelating agent and alkaline agent is added from the chelating agent and alkaline agent addition unit 40 to the pipe arrangement L1. Subsequently, as discussed above, the first step S2 and the second step S3 are repeated alternately.

On the other hand, when the second step S3 is carried out earlier, for example, amorphous silica is precipitated at the scale precipitation unit 16 of the scale detection unit 61. In this situation, the output value (i.e., flow rate difference) from the scale detection unit 61 gradually increases as the second step S3 proceeds, as illustrated in FIG. 8. Then, when the output value (i.e., flow rate difference) of the scale detection unit 61 exceeds the upper limit threshold, the second step S3 is switched to the first step S2, and the liquid containing the chelating agent and alkaline agent is added from the chelating agent and alkaline agent addition unit 40 to the pipe arrangement L1.

When the second step S3 is switched to the first step S2, amorphous silica precipitated at the scale precipitation unit 16 is dissolved, and the output value (i.e., pressure difference) of the scale detection unit 60 decreases, accordingly. Then, when the output value (i.e., pressure difference) from the scale detection unit 60 becomes lower than the lower limit threshold, the first step S2 is switched to the second step S3, and the operation of the chelating agent and alkaline agent addition unit 40 stops. Subsequently, as discussed above, the second step S3 and the first step S2 are repeated alternately.

In the first step S2, the pump 8 is activated together with the opening of the valves 7, 19, and 23 and closing of the valve 20. Then, the liquid containing the chelating agent and alkaline agent is injected into the pipe arrangement L1 through which the influent water flows.

In the second step S3, the pump 8 is stopped together with the closing of the valves 7, 19, and 23 and opening of the valve 20, so as to stop the injection of the liquid containing the chelating agent and alkaline agent.

By carrying out the above-described first step S2 and second step S3 alternately in many variations as described above, the generation of the scale can be suppressed.

When the liquid containing the chelating agent and alkaline agent is injected into the pipe arrangement L1 through which the influent water flows, from the chelating agent and alkaline agent addition unit 40, the liquid reacts with polyvalent metal ions contained in the influent water, and compounds (for example, CSH) are precipitated. In addition, amorphous silica is dissolved, as illustrated in FIG. 9. Then, when the injection of the liquid containing the chelating agent and alkaline agent is stopped, amorphous silica is precipitated. In addition, compounds precipitated (for example, CSH) by reacting with polyvalent metal ions are dissolved.

In the fifth embodiment, when the pressure difference calculated by the calculation unit 25 of the controller 11 reaches the upper limit threshold, the valve close signals are sent from the controller 11 to the valves 7, 19, and 23, and the pump stop signal is also sent from the controller 11 to the pump 8 of the chelating agent and alkaline agent addition unit 40. Accordingly, the pump 8 is in a stopped state together with the closing of the valves 7, 19, and 23. The injection of the liquid containing the chelating agent and alkaline agent stops.

Furthermore, in this situation, the valve 20 is opened by the valve open signal from the controller 11, and the influent water which has flowed through the scale detection unit 60 is supplied to the acidity injection well 15, flowing through the pipe arrangement L17.

The injection of the liquid containing the chelating agent and alkaline agent stops, and when the pressure difference calculated by the calculation unit 25 of the controller 11 reaches the lower limit threshold, the valve close signal is sent to the valve 20 from the controller 11. Moreover, in this situation, the valve open signals are sent from the controller 11 to the valves 7, 19, and 23, and the pump activating signal is also sent from the controller 11 to the pump 8. Accordingly, the pump 8 is activated together with the closing of the valve 20 and opening of the valves 7, 19, and 23. The injection of the liquid containing the chelating agent and alkaline agent is restarted. Then, the influent water which has flowed through the scale detection unit 60 is supplied to the alkalinity injection well 14, flowing through the pipe arrangement L18.

As in the fifth embodiment, the first step of injecting the liquid containing the chelating agent and alkaline agent into the influent water and the second step of stopping the injection of the liquid containing the chelating agent and alkaline agent are switched alternately, so that the added amounts of the chelating agent and the alkaline agent can be reduced and reduction of the cost can be achieved.

In addition, the scale generated in the influent water is detected by the scale detection unit 61, and the injection of the chelating agent and alkaline agent is controlled based on the signal output from the scale detection unit 61, so that the added amounts of the chelating agent and the alkaline agent can be reduced more.

Sixth Embodiment

Figure 10:
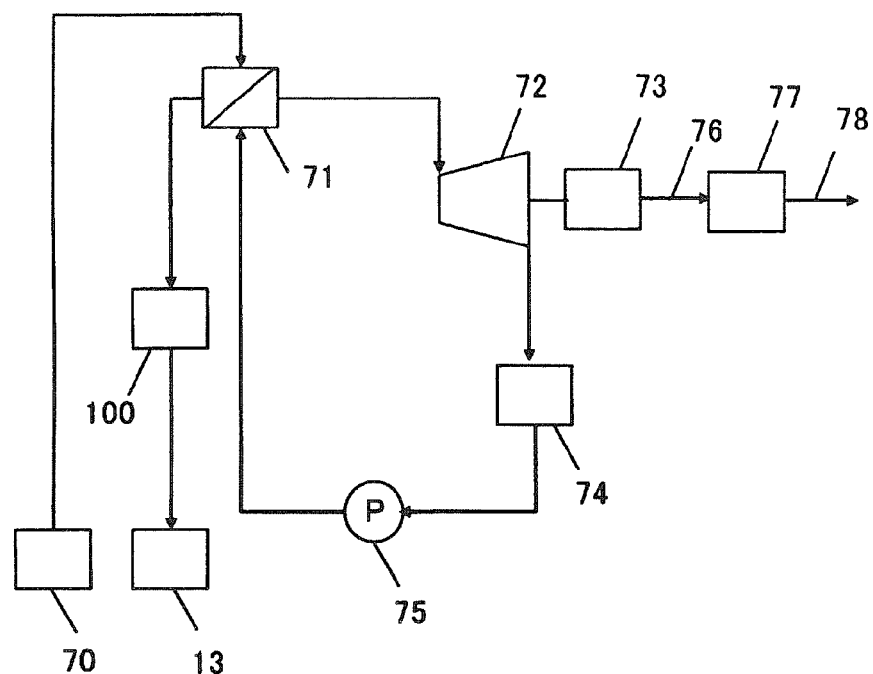
FIG. 10 is a schematic configuration view of a geothermal power generation system according to a sixth embodiment of the present disclosure.
Figure 11:
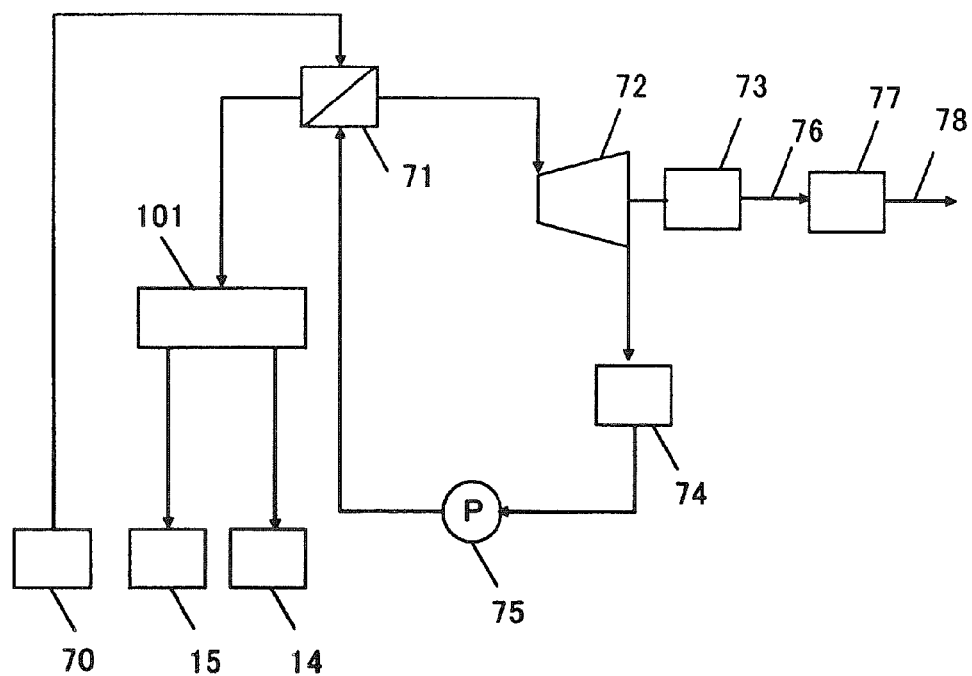
FIG. 11 is a schematic configuration view of a geothermal power generation system according to a seventh embodiment of the present disclosure.

Next, a sixth embodiment of the present disclosure will be described with reference to FIG. 10. The sixth embodiment of the present disclosure is related to a geothermal power generation system including a scale suppression apparatus 100 illustrated in FIG. 1, FIG. 2, or FIG. 4. Specifically, the geothermal power generation system includes an evaporator 71 configured to evaporate the medium with geothermal water taken out of a production well 70, a turbine 72 configured to rotate with the medium evaporated by the evaporator 71, a power generator 73 configured to be coupled to the turbine 72 and generate the power with the rotational power of the turbine 72, a condenser 74 configured to condense the medium come out of the turbine 72, and a circulation pump 75 configured to feed the medium condensed by the condenser 74 to the evaporator 71, so that the geothermal water that has passed through the evaporator 71 is used as the influent water to the scale suppression apparatus 100. The geothermal water that has come out of the scale suppression apparatus 100 is supplied to the injection well 13. The power generated by the power generator 73 is input into a conditioner 77 through power wiring 76, is converted into a desired voltage current by the conditioner 77, and is then output through power output wiring 78 to the exterior.

Seventh Embodiment

Next, a seventh embodiment of the present disclosure will be described with reference to FIG. 10. The seventh embodiment of the present disclosure is related to a geothermal power generation system including a scale suppression apparatus 101 illustrated in FIG. 3 or FIG. 5. Specifically, the geothermal power generation system includes the evaporator 71 configured to evaporate the medium with geothermal water taken out of the production well 70, the turbine 72 configured to rotate with the medium evaporated by the evaporator 71, the power generator 73 configured to be coupled to the turbine 72 and generate the power with the rotational power of the turbine 72, the condenser 74 configured to condense the medium that has come out of the turbine 72, and the circulation pump 75 configured to feed the medium condensed by the condenser 74 to the evaporator 71, so that the geothermal water that has passed through the evaporator 71 is used as the influent water to the scale suppression apparatus 101. Alkali discharged water that has come out of the scale suppression apparatus 101 is made to flow into the alkalinity injection well 14, whereas acid discharged water is made to flow into the acidity injection well 15. The power generated by the power generator 73 is input into the conditioner 77 through the power wiring 76, is converted into a desired voltage current by the conditioner 77, and is then output through the power output wiring 78 to the exterior.

With such a configuration, it is made possible to prevent the alkaline water and acid water from being mixed together to become neutral at the discharged destination. It is therefore possible to reduce the frequency of maintenance by suppressing the generation of scale.

In the first to seventh embodiments, as illustrated in FIG. 8, the second step S3 of stopping the injection of the chelating agent and the alkaline agent is performed earlier, and then the first step S2 of injecting the chelating agent and the alkaline agent is performed later. In this manner, it is possible to reduce the amounts of the chelating agent and the alkaline agent, as compared to the method of performing the first step S2 earlier as illustrated in FIG. 7.

It is to be noted that when the chelating agent is added at a mol concentration equal to the calcium ion concentration, there are few metals that can be caught by the chelating agent except for calcium in the case of the geothermal water, and the chelating agent will catch all calcium in the geothermal water. Accordingly, CSH may not be precipitated. Therefore, when insufficient chelating agent is added, CSH will be piled up before silica is dissolved and the output value will not become lower than the lower limit threshold. Therefore, it is desirable that the chelating agent concentration be reduced little by little from the mol concentration equal to the calcium ion concentration, so that the output from the scale detection unit becomes lower than the lower limit threshold in the first step.

Heretofore, according to each of the embodiments of the present disclosure, it is possible to suppress the generation of the silica-based scale and the calcium-based scale in a cheaper method than adding the chelating agent to the influent water containing at least the silica component and the calcium component.

The invention claimed is:

1. A scale suppression apparatus of injecting chelating and alkaline agents into influent water containing at least a silica component and a calcium component to suppress generation of scale, the scale suppression apparatus comprising:
 a controller configured to alternately switch between an injection operation of injecting the chelating and alkaline agents and stopping of the injection operation; and
 a scale detection unit configured to detect a precipitation state of the scale on a downstream side from an injection point into which the chelating and alkaline agents are injected,
 wherein the controller is configured to include:
  a memory configured to store an output signal from the scale detection unit; and
  a calculation unit configured to calculate an index of the injection operation based on the output signal from the scale detection unit,
 wherein the controller is configured to alternately switch between the injection operation of injecting the chelating and alkaline agents and the stopping of the injection operation by comparing a calculation result of the calculation unit with an upper limit threshold and a lower limit threshold, and
 wherein the controller is configured to switch between the injection operation and the stopping of the injection operation when the calculation result is greater than the upper limit threshold or less than the lower limit threshold.

2. The scale suppression apparatus according to claim 1, wherein the scale detection unit includes:
a scale precipitation unit;
an upstream-side manometer configured to measure a pressure on an upstream side from the scale precipitation unit and output a signal to the controller; and
a downstream-side manometer configured to measure a pressure on a downstream side from the scale precipitation unit and output a signal to the controller.

3. The scale suppression apparatus according to claim 1, wherein the scale detection unit includes:
a scale precipitation unit; and
a flowmeter configured to measure a flow rate of an upstream side or a downstream side from the scale precipitation unit and output a signal to the controller, and
wherein the controller obtains a value by subtracting a subsequent flow rate from the flow rate below the lower limit threshold.

4. A geothermal power generation system comprising:
an evaporator configured to evaporate a medium with geothermal water;
a turbine configured to rotate with the medium;
a power generator configured to be coupled to the turbine and generate power with rotational power of the turbine;
a condenser configured to condense the medium come out of the turbine;
a circulation pump configured to feed the medium condensed by the condenser to the evaporator; and
a scale suppression unit according to claim 1, configured to use the geothermal water that has passed through the evaporator as influent water.

5. A scale suppression apparatus of injecting chelating and alkaline agents into influent water containing at least a silica component and a calcium component to suppress generation of scale, the scale suppression apparatus comprising:
a controller configured to alternately switch between an injection operation of injecting the chelating and alkaline agents and stopping of the injection operation; and
a scale detection unit configured to detect a precipitation state of the scale on a downstream side from an injection point into which the chelating and alkaline agents are injected,
wherein the controller is configured to include:
a memory configured to store an output signal from the scale detection unit; and
a calculation unit configured to calculate an index of the injection operation based on the output signal from the scale detection unit,
wherein the controller is configured to alternately switch between the injection operation of injecting the chelating and alkaline agents and the stopping of the injection operation by comparing a calculation result of the calculation unit with an upper limit threshold and a lower limit threshold, and
wherein the controller is configured to switch between the stopping of the injection operation and the injection operation when the calculation result is greater than the upper limit threshold or less than the lower limit threshold.

6. A scale suppression apparatus of injecting chelating and alkaline agents into influent water containing at least a silica component and a calcium component to suppress generation of scale, the scale suppression apparatus comprising:
a controller configured to alternately switch between an injection operation of injecting the chelating and alkaline agents and stopping of the injection operation; and
a scale detection unit configured to detect a precipitation state of the scale on a downstream side from an injection point into which the chelating and alkaline agents are injected,
wherein the controller is configured to include:
a memory configured to store an output signal from the scale detection unit; and
a calculation unit configured to calculate an index of the injection operation based on the output signal from the scale detection unit,
wherein the controller is configured to alternately switch between the injection operation of injecting the chelating and alkaline agents and the stopping of the injection operation by comparing a calculation result of the calculation unit with an upper limit threshold and a lower limit threshold, and
wherein the controller is configured to switch between the injection operation and the stopping of the injection operation when the calculation result is greater than the upper limit threshold or less than the lower limit threshold.

7. A scale suppression apparatus of injecting chelating and alkaline agents into influent water containing at least a silica component and a calcium component to suppress generation of scale, the scale suppression apparatus comprising:
a controller configured to alternately switch between an injection operation of injecting the chelating and alkaline agents and stopping of the injection operation; and
a scale detection unit configured to detect a precipitation state of the scale on a downstream side from an injection point into which the chelating and alkaline agents are injected,
wherein the controller is configured to include:
a memory configured to store an output signal from the scale detection unit; and
a calculation unit configured to calculate an index of the injection operation based on the output signal from the scale detection unit,
wherein the controller is configured to alternately switch between the injection operation of injecting the chelating and alkaline agents and the stopping of the injection operation by comparing a calculation result of the calculation unit with an upper limit threshold and a lower limit threshold, and
wherein the controller is configured to switch between the stopping of the injection operation and the injection operation when the calculation result is greater than the upper limit threshold or less than the lower limit threshold.

8. A scale suppression method of suppressing generation of scale by an injection operation of injecting chelating and alkaline agents into influent water containing at least a silica component and a calcium component, the scale suppression method comprising:
a first step of injecting the chelating and alkaline agents;
a second step of stopping injecting the chelating and alkaline, agents; and
detecting a precipitation state of scale on a downstream side from an injection point into which the chelating and alkaline agents are injected,
wherein the first step and the second step are alternately switched by comparing an index of the injection operation calculated based on the precipitation state of the scale with an upper limit threshold and a lower limit threshold, and wherein the first step and the second step are alternately switched when the index of the injection is greater than the upper limit threshold or less than the lower limit threshold.

9. A scale suppression method of suppressing generation of scale by an injection operation of injecting chelating and alkaline agents into influent water containing at least a silica component and a calcium component, the scale suppression method comprising:

a first step of injecting the chelating and alkaline agents;

a second step of stopping injecting the chelating and alkaline, agents; and detecting a precipitation state of scale on a downstream side from an injection point into which the chelating and alkaline agents are injected, wherein the first step and the second step are alternately switched by comparing an index of the injection operation calculated based on the precipitation state of the scale with an upper limit threshold and a lower limit threshold, and wherein the first step and the second step are alternately switched when the index of the injection is greater than the upper limit threshold or less than the lower limit threshold.

* * * * *